United States Patent
Whitman, Jr.

(10) Patent No.: US 7,616,755 B2
(45) Date of Patent: Nov. 10, 2009

(54) EFFICIENCY REPORT GENERATOR

(75) Inventor: Raymond Whitman, Jr., Grayson, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 964 days.

(21) Appl. No.: 10/741,394

(22) Filed: Dec. 19, 2003

(65) Prior Publication Data

US 2005/0137893 A1    Jun. 23, 2005

(51) Int. Cl.
    H04M 3/00    (2006.01)
(52) U.S. Cl. .................. 379/265.03; 379/265.06
(58) Field of Classification Search ............ 379/265.02, 379/265.06, 265.03
    See application file for complete search history.

(56) References Cited

U.S. PATENT DOCUMENTS

| | | | |
|---|---|---|---|
| 5,185,780 A | 2/1993 | Leggett | |
| 5,872,938 A | 2/1999 | Williams | |
| 5,903,641 A | 5/1999 | Tonisson | |
| 5,963,635 A | 10/1999 | Szlam et al. | |
| 5,974,414 A | 10/1999 | Stanczak et al. | |
| 5,991,390 A | 11/1999 | Booton | |
| 6,044,355 A | 3/2000 | Crockett et al. | |
| 6,490,252 B1 | 12/2002 | Riggan et al. | |
| 6,493,446 B1 | 12/2002 | Cherry | |
| 6,584,191 B1 | 6/2003 | McPartlan et al. | |
| 6,639,982 B1 | 10/2003 | Stuart et al. | |
| 6,775,378 B1 | 8/2004 | Villena et al. | |
| 6,842,515 B2 | 1/2005 | Mengshoel et al. | |
| 6,865,266 B1 | 3/2005 | Pershan | |
| 6,983,045 B2 * | 1/2006 | Parker ...................... | 379/266.1 |
| 6,996,076 B1 | 2/2006 | Forbes et al. | |
| 7,023,979 B1 | 4/2006 | Wu et al. | |
| 7,103,562 B2 | 9/2006 | Kosiba et al. | |
| 7,203,655 B2 * | 4/2007 | Herbert et al. ............. | 705/11 |
| 7,321,657 B2 | 1/2008 | Whitman | |
| 7,499,844 B2 | 3/2009 | Whitman | |
| 7,539,297 B2 | 5/2009 | Whitman, Jr. | |
| 2001/0034637 A1 | 10/2001 | Lin et al. | |
| 2001/0038689 A1 | 11/2001 | Liljestrand et al. | |
| 2001/0043586 A1 | 11/2001 | Miloslavsky | |
| 2002/0041673 A1 | 4/2002 | Berrondo et al. | |

(Continued)

OTHER PUBLICATIONS

Whitman; Examiner Interview Summary Record mailed Feb. 5, 2008; U.S. Appl. No. 10/741,643, filed Dec. 19, 2003.

(Continued)

*Primary Examiner*—Rasha S Al Aubaidi
(74) *Attorney, Agent, or Firm*—Thomas, Kayden, Horstemeyer & Risley, LLP

(57) ABSTRACT

Systems and methods for generating efficiency reports, which in one embodiment among many, can be broadly summarized by a representative method of associating a call-center supervisor with a call center, obtaining a network statistic for the call center, categorizing the network statistic into one of a group of multiple categories, and providing a pictorial representation of the group of multiple categories. Another embodiment can be described as an efficiency report generator that has logic configured to associate a call-center supervisor with a call center, logic configured to obtain a network statistic for the call center, logic configured to categorize the network statistic into one of a group of multiple categories; and logic configured to provide a pictorial representation of the group of multiple categories.

15 Claims, 7 Drawing Sheets

U.S. PATENT DOCUMENTS

| | | |
|---|---|---|
| 2002/0143599 A1 | 10/2002 | Nourbakhsh et al. |
| 2002/0157043 A1 | 10/2002 | Hite et al. |
| 2002/0159439 A1 | 10/2002 | Marsh et al. |
| 2003/0007622 A1 | 1/2003 | Kalmanek et al. |
| 2003/0088534 A1 | 5/2003 | Kalantar et al. |
| 2003/0095652 A1 | 5/2003 | Mengshoel et al. |
| 2003/0231595 A1 | 12/2003 | Zino et al. |
| 2004/0019542 A1 | 1/2004 | Fuchs et al. |
| 2004/0062231 A1 | 4/2004 | Wyatt |
| 2004/0128379 A1 | 7/2004 | Mizell et al. |
| 2004/0138944 A1 | 7/2004 | Whitacre et al. |
| 2004/0165531 A1 | 8/2004 | Brady |
| 2004/0165716 A1 | 8/2004 | Galvin |
| 2004/0168100 A1 | 8/2004 | Thottan et al. |
| 2005/0007955 A1 | 1/2005 | Schrodi |
| 2005/0013287 A1 | 1/2005 | Wallentin et al. |
| 2005/0013425 A1* | 1/2005 | Contractor ............. 379/201.12 |
| 2005/0043986 A1 | 2/2005 | McConnell et al. |
| 2005/0071211 A1 | 3/2005 | Flockhart et al. |
| 2005/0131748 A1 | 6/2005 | Parker |
| 2005/0135600 A1 | 6/2005 | Whitman |
| 2005/0135601 A1 | 6/2005 | Whitman |
| 2005/0137893 A1 | 6/2005 | Whitman |
| 2005/0138167 A1 | 6/2005 | Whitman |
| 2005/0160142 A1 | 7/2005 | Whitman |
| 2005/0175971 A1 | 8/2005 | Mcilwaine et al. |
| 2006/0098802 A1* | 5/2006 | Parker ................... 379/265.03 |
| 2006/0109975 A1* | 5/2006 | Judkins et al. ......... 379/265.02 |
| 2006/0120282 A1 | 6/2006 | Carlson et al. |

OTHER PUBLICATIONS

Whitman; Final Rejection mailed Apr. 3, 2008; U.S. Appl. No. 10/741,643, filed Dec. 19, 2003.
Whitman; Advisory Action mailed Dec. 31, 2007; U.S. Appl. No. 10/741,612, filed Dec. 19, 2003.
Whitman; Advisory Action mailed Feb. 20, 2008; U.S. Appl. No. 10/741,738, filed Dec. 19, 2003.
Whitman; Non-Final Rejection mailed Apr. 15, 2008; U.S. Appl. No. 10/741,738, filed Dec. 19, 2003.
Whitman; Non-Final Rejection mailed Jan. 24, 2008; U.S. Appl. No. 10/741,650, filed Dec. 19, 2003.
Whitman; Notice of Allowance and Fees due mailed Oct. 2, 2007 for U.S. Appl. No. 10/740,873, filed Dec. 19, 2003.
Whitman; Pre-Brief Appeal Conference decision mailed Jul. 18, 2007 for U.S. Appl. No. 10/741,643, filed Dec. 19, 2003.
Whitman; Notice of Allowance and Fees Due mailed May 28, 2008 for U.S. Appl. No. 10/741,612, filed Dec. 19, 2003.
Whitman; Final Rejection mailed Jun. 2, 2008 for U.S. Appl. No. 10/741,650, filed Dec. 19, 2003.
Mehrotra; "Call Center Simulation Modling; Methods, Challenges and Opportunities", 2003 Winter Simulation Conference, San Francisco, CA, 9 pages.
Klunge; "Simulation of a Claims Call Center: A Success and a Failure"; 1998 Winter Simulation Conference, 6 pages.
Bapat; "Using Simulation in Call Centers", 1998 Winter Simulation Conference, 5 pages.
Whitman; U.S. Appl. No. 10/741,650, filed Dec. 19, 2003.
Whitman; U.S. Appl. No. 11/960,238, filed Dec. 19, 2007.
Whitman; U.S. Appl. No. 10/741,738, filed Dec. 19, 2003.
Whitman; U.S. Appl. No. 10/740,874, filed Dec. 19, 2003.
Whitman; U.S. Appl. No. 10/741,643, filed Dec. 19, 2003.
Whitman; U.S. Appl. No. 10/740,873, filed Dec. 19, 2003.
Whitman; U.S. Appl. No. 10/741,612, filed Dec. 19, 2003.
Whitman; Non-Final Rejection mailed Sep. 25, 2007; U.S. Appl. No. 10/741,650, filed Dec. 19, 2003.
Whitman; Non-Final Rejection mailed Sep. 11, 2006; U.S. Appl. No. 10/741,738, filed Dec. 19, 2003.
Whitman; Non-Final Rejection mailed Mar. 12, 2007; U.S. Appl. No. 10/741,738, filed Dec. 19, 2003.
Whitman; Non-Final Rejection mailed Jul. 24, 2007; U.S. Appl. No. 10/741,738, filed Dec. 19, 2003.
Whitman; Final Rejection mailed Nov. 20, 2007; U.S. Appl. No. 10/741,738, filed Dec. 19, 2003.
Whitman; Non- Final Rejection mailed Jul. 6, 2007; U.S. Appl. No. 10/740,874, filed Dec. 19, 2003.
Whitman; Non-Final Rejection mailed Dec. 12, 2007; U.S. Appl. No. 10/740,874, filed Dec. 19, 2003.
Whitman; Non-Final Rejection mailed Oct. 10, 2006; U.S. Appl. No. 10/740,873, filed Dec. 19, 2003.
Whitman; Final Rejection mailed Apr. 11, 2007; U.S. Appl. No. 10/740,873, filed Dec. 19, 2003.
Whitman; Notice of Allowance and Fees Due mailed Oct. 10, 2007; U.S. Appl. No. 10/740,873, filed Dec. 19, 2003.
Whitman; Non-Final Rejection mailed Jan. 16, 2007; U.S. Appl. No. 10/741,612, filed Dec. 19, 2003.
Whitman; Final Rejection mailed Jul. 6, 2007; U.S. Appl. No. 10/741,612, filed Dec. 19, 2003.
Whitman; Final Rejection mailed Oct. 17, 2007; U.S. Appl. No. 10/741,612, filed Dec. 19, 2003.
Whitman; Non-Final Rejection mailed Aug. 3, 2005; U.S. Appl. No. 10/741,643, filed Dec. 19, 2003.
Whitman; Examiner Interview Summary Record mailed Aug. 23, 2005; U.S. Appl. No. 10/741,643, filed Dec. 19, 2003.
Whitman; Final Rejection mailed Jan. 25, 2006; U.S. Appl. No. 10/741,643, filed Dec. 19, 2003.
Whitman; Non-Final Rejection mailed Aug. 2, 2006; U.S. Appl. No. 10/741,643, filed Dec. 19, 2003.
Whitman; Final Rejection mailed Feb. 6, 2007; U.S. Appl. No. 10/741,643, filed Dec. 19, 2003.
Whitman; Non-Final Rejection mailed Oct. 5, 2007; U.S. Appl. No. 10/741,643, filed Dec. 19, 2003.
Whitman; Notice of Allowance and Fees Due mailed Oct. 17, 2008 for U.S. Appl. No. 10/741,738, filed Dec. 19, 2003.
Whitman; Non-Final Rejection mailed Sep. 26, 2008 for U.S. Appl. No. 10/741,650, filed Dec. 19, 2003.
Whitman; Examiner Interview Summary mailed May 20, 2008 for U.S. Appl. No. 10/741,643, filed Dec. 19, 2003.

* cited by examiner

46 ⟶

| STATISTICAL ANALYSIS/ FORECAST MODULE | 48 |
| --- | --- |
| STATISTICAL DATABASE | 50 |
|    ACCUMULATED STATISTICS | 54 |
|    DAILY LOG | 56 |
| AGENT PROFILE DATABASE | 52 |
| EFFICIENCY REPORT GENERATOR | 118 |

FIG. 3

| DAILY LOG | | 56 |
| --- | --- | --- |
| WORK FORCE | 5 | |
| DATE | 08/21/2003 | |
| DAILY CALL VOLUME | | 35,294 |
| DAILY WORK VOLUME | | 47,503 |
| DAILY AWT | | 27.9 |
| DAILY ANS | | 2.4 |
| DAILY OCC | | 85 |

FIG. 4

| ACCUMULATED STATISTICS | | 54 |
| --- | --- | --- |
| WORK FORCE | 5 | |
| CALL VOLUME | | 35,214 |
| WORK VOLUME | | 9,684 |
| AWT | | 27.5 |
| ANS | | 2.7 |
| OCC | | 91 |

FIG. 5

| AGENT PROFILE | 52 |
|---|---|
| AGENT | 123456789 |
| WORK FORCE | 16 |
| OFFICE | 5 |
| LANGUAGE SKILLS | |
| ENGLISH | 1 |
| SPANISH | 1 |
| GERMAN | 0 |
| FRENCH | 0 |
| JAPANESE | 0 |
| CHINESE | 0 |
| WORK SKILLS | |
| DIRECTORY ASSISTANCE | 1 |
| BILLING | 1 |
| CUSTOMER SERVICE | 0 |
| TECHNICAL SERVICE | 0 |
| DA RATING | |
| AWT | 2.5 |
| ERROR RATE | 0.3 |
| TOUR COMPLIANCE | 90 |
| SWITCH TOUR COMPLIANCE | 94 |
| EXPERIENCE | 2.1 |
| BILLING RATING | |
| AWT | 5.5 |
| ERROR RATE | 1.5 |
| TOUR COMPLIANCE | 90 |
| SWITCH TOUR COMPLIANCE | 93 |
| EXPERIENCE | 5.1 |

FIG. 6

| TIME | 00:15 | 00:30 | | 11:45 | 12:00 | 12:15 | | 23:45 | 24:00 |
|---|---|---|---|---|---|---|---|---|---|
| PROJECTED | 6 | 6 | | 18 | 22 | 30 | | 6 | 4 |
72 — (00:15, 00:30 group); 74 — (11:45, 12:00, 12:15 group)
FIG. 7
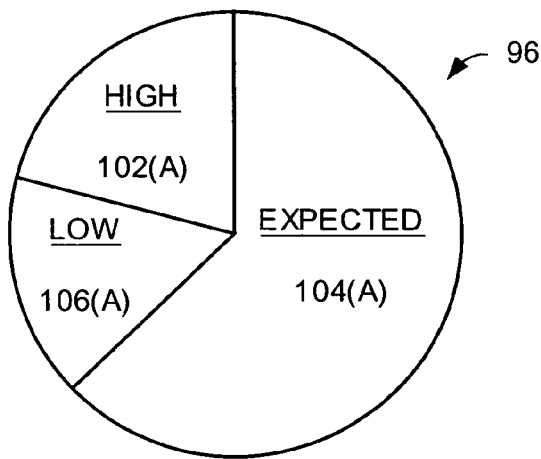
FIG. 9A
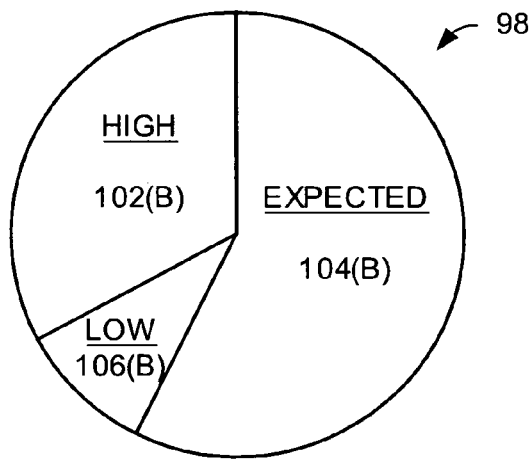
FIG. 9B

EFFICIENCY REPORT GENERATOR

CROSS-REFERENCE TO RELATED APPLICATIONS

This application is one of seven related co-pending U.S. utility patent applications, which are all filed on the same day as the present application. The other six patent applications, which are each incorporated in their entireties by reference herein, are listed by attorney docket number and title as the following:

190250-1640—"Generation of Automated Recommended Parameter Changes Based on Force Management System (FMS) Data Analysis";
190250-1650—"Dynamic Force Management System";
190250-1660—"Agent Scheduler Incorporating Agent Profiles";
190250-1670—"Method and System for Predicting Network Usage in a Network Having Re-occurring Usage Variations";
190250-1680—"Resource Assignment in a Distributed Environment"; and
190250-1740—"Force Management Automatic Call Distribution and Resource Allocation Control System".

TECHNICAL FIELD

The present disclosure is generally related to management of workforces and, more particularly, is related to management of workforces in call centers.

BACKGROUND OF THE DISCLOSURE

A modern telephony system includes a switch that routes incoming calls to agents in workforces and a control center that receives information from the switch. The control center includes a call-center supervisor who is trained to review the information from the switch and trained to monitor the call traffic at a workforce.

Among other things, the call-center supervisor is responsible for making certain that the workforce has a sufficient number of agents working at any given time. Generally, the call-center supervisor periodically receives from the switch network statistics for a given time span. The network statistics for a given time span can include the average work time, i.e., the average amount of time an agent takes to handle a call, average number of buffered calls, average hold/wait time, i.e., the average amount of time a call spends in a buffer before being answered by an agent, etc. for that given time span. The call-center supervisor uses the network statistics for the given time span to determine the number of agents that are needed for a subsequent time span. What is sought is a method and system for enabling the call-center supervisor to efficiently manage the workforce.

SUMMARY OF THE DISCLOSURE

Embodiments of the present disclosure provide a system and method for generating efficiency reports.

Briefly described, in architecture, one embodiment of the system, among others, is implemented as follows. An efficiency report generator that has logic configured to associate a call-center supervisor with a call center, logic configured to obtain a network statistic for the call center, logic configured to categorize the network statistic into one of a group of multiple categories; and logic configured to provide a pictorial representation of the group of multiple categories.

One embodiment of the present disclosure can also be viewed as providing methods for generating efficiency reports. In this regard, one embodiment of such a method, among others, is broadly summarized by the following steps: obtaining a network statistic for the call center, categorizing the network statistic into one of a group of multiple categories, and providing a pictorial representation of the group of multiple categories.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a block diagram of a database.
FIG. 4 is a block diagram of a daily log of the telephony system.
FIG. 5 is a block diagram of accumulated statistics of the telephony system.
FIG. 6 is a block diagram of an agent profile.
FIG. 7 is a block diagram of a projected agent line.
FIGS. 9A-9C are graphical efficiency reports.

DETAILED DESCRIPTION OF THE PREFERRED EMBODIMENT

The present disclosure is described in terms of managing resources in call centers for a telephone system. However, this description is for illustrative purposes only and is a non-limiting example of the present disclosure. The present disclosure can also be implemented in any organization, among others, having workforces that respond to variable workloads such as, but not limited to, a group of agents receiving calls through an automated call distribution process including private branch exchange (PBX) and switching configuration. Thus, the present disclosure is intended to cover any network.

Any process descriptions or blocks in flow charts should be understood as representing modules, segments, or portions of code which include one or more executable instructions for implementing specific logical functions or steps in the process, and alternate implementations are included within the scope of preferred embodiments in which functions may be executed out of order from that shown or discussed, including substantially concurrently or in reverse order, depending on the functionality involved, as would be understood by those reasonably skilled in the art of the present disclosure.

Figure 1:
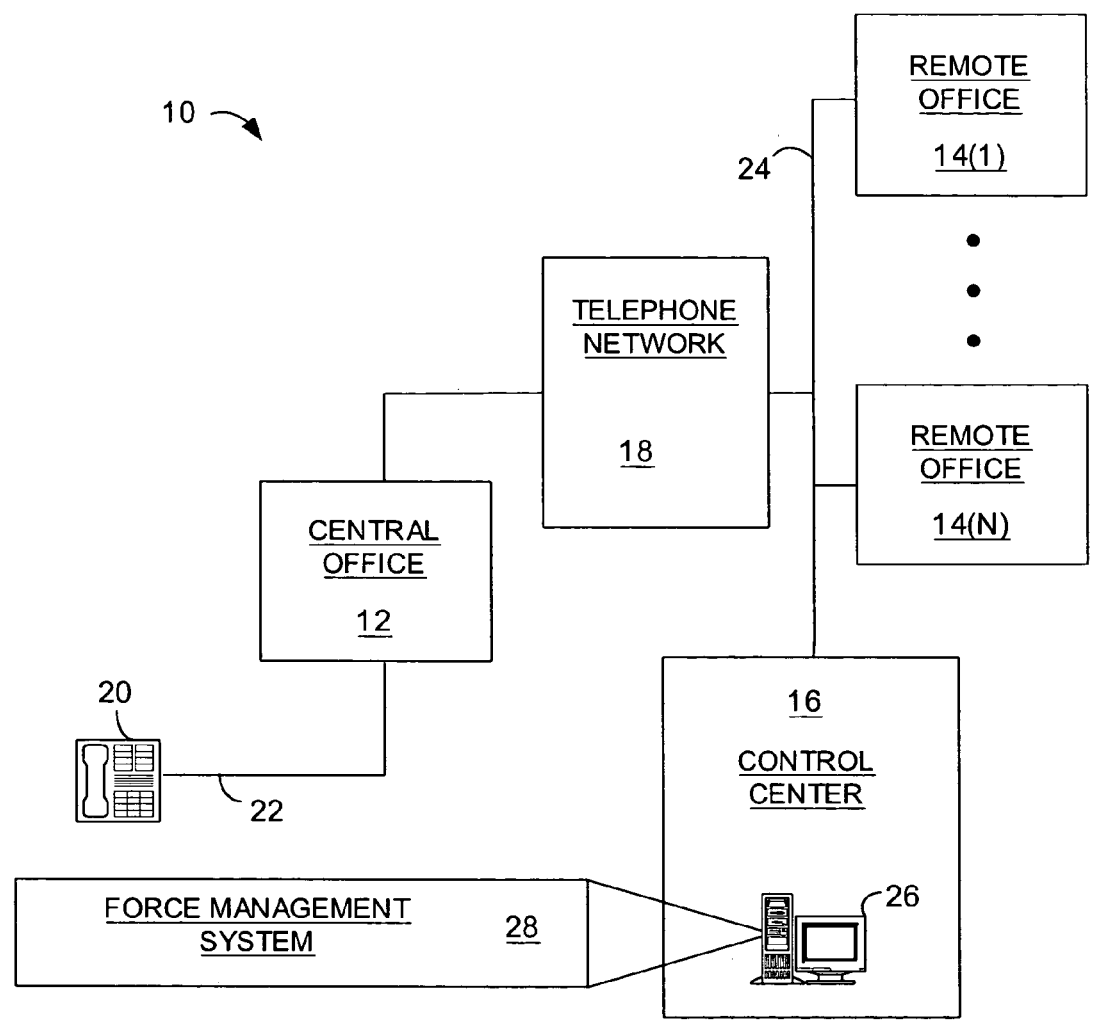
FIG. 1 is a block diagram of a telephony system.

Referring to FIG. 1, a telephone system 10 having a central office 12, a plurality of remote offices 14, and a control center 16, are all connected to a telephone network 18. A subscriber uses a telephone 20, which is connected to the central office 12 via a communication link 22, to access services of the telephone system.

The central office 12 includes a switch (not shown) that routes the subscriber's call to the telephone network 18, which includes general telephony circuitry such as central offices, trunks, end-offices, etc., known to those skilled in the art.

Typically, the remote offices are call centers from which agents make or receive calls, which handle, among other things, incoming subscriber service calls such as, but not limited to, "Directory Assistance Type" calls and "Billing Type Calls". Responsive to the subscriber's call being a service call, the central office 12 routes the call through the network to one of the remote offices 24, via a communication link 24, where an agent handles the call. The communication links 22 and 24 can be any communication link: wired, wireless, optical fibers, etc., known to those skilled in the art.

Typically, the telephone system 10 must meet performance requirements established by a regulatory body, and the control center 16 is responsible for, among other things, providing the necessary human resource, e.g., agents, to the remote offices 14 to meet the performance requirements. The control center 16 includes supervisory personnel, call-center supervisors, (not shown) and a computer system 26 having a force management system (FMS) 28 included therein. Generally, a computer network 44 (see FIG. 2) connects the central office 12, remote centers 14, and the control center 16 such that the FMS 28 and other computer services are available to authorized personnel at any of the locations.

In one embodiment, among others, schedulers employ the FMS 28 to generate, among other things, agent lines, which are explained in detail hereinbelow, and tours (work shifts) for agents. The schedulers may be located in the central office or in the control center 16.

Figure 2:
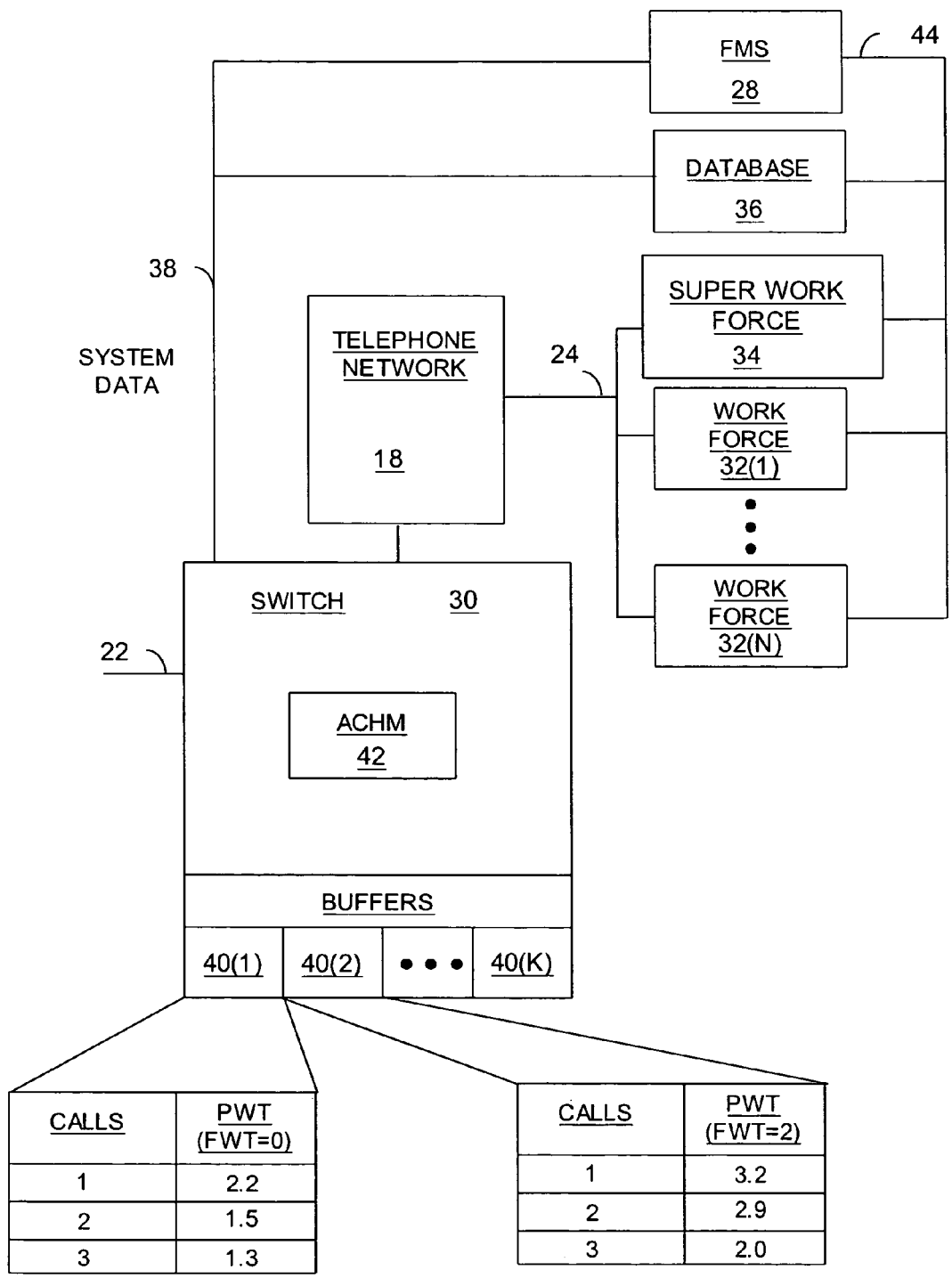
FIG. 2 is a block diagram of a portion of a telephony system.

Referring to FIG. 2, the central office 12 includes a switch 30, which receives telephone calls from subscribers via communication link 22 and, among other things, routes the calls to workforces 32 and super workforce 34. For the purposes of this disclosure, a workforce is comprised of a set of agents assigned to handle a specific type of call. For example, workforce 32(1) is a directory assistance (DA) workforce; and workforce 32(2) (not shown) is a billing workforce of the telephone system 10. Other workforces include workforces that call out instead of receiving incoming calls, an example of which is a telemarketing workforce. Each workforce 32 maybe distributed throughout multiple remote offices 14.

A super workforce 34 is comprised of agents assigned to handle multiple types of calls. For example, agents of the super workforce 34 might be assigned to handle both directory assistance calls and other types of incoming calls for subscribers speaking a language other than English. The super workforce 34 may also be distributed through multiple remote offices 14. For the purposes of this disclosure, a super-workforce shall be treated as if it were a "workforce."

In one preferred embodiment, the switch 30 is an automated computerized system such as, but not limited to, Northern Telecom DMS 200, Northern Telecom Meridian, Rockwell ISS-3000, and Lucent 5E into which agents log in. To log-in, each agent provides a user-name and a password, which in some embodiments may be optional. The switch 30 is in communication with a database 36 via a communication link 38. The database 36 includes agent profiles 54 (see FIG. 6), and each agent profile 54 provides, among other things, information regarding the training and efficiency of the agent. When an agent logs onto the switch 30, the switch 30 uses the agent profile 54 for that agent to determine, among other things, the agent's workforce. The switch 30 also determines, during the log-in procedure, from which console/terminal (not shown) the agent is working. When an agent is logged into the switch 30, the switch 30 monitors call traffic to the agent and whether the agent is logged into the switch 30 and provides this system information, among other information to the database 36. Generally, the agent logs out of the switch 30 for breaks and training so that the switch 30 knows that the agent is not available to handle calls. The log-out times are also included in the system data.

Among other things, for certain types of calls the switch 30 attempts to handle incoming calls automatically. If the switch 30 cannot handle the incoming calls automatically, the switch 30 routes the incoming calls to an agent in an appropriate workforce 32. The switch 30 includes a plurality of buffers 40 and an automated call-handling module (ACHM) 42. The ACHM 42 includes in some embodiments, tone and voice recognition logic for interfacing with subscribers and, if possible, providing the necessary services. For example, when the ACHM 42 receives a "Directory Assistance Type" call, the ACHM 42 delivers a series of questions to the caller such as: "what state?", "what city?", "what listing?". The ACHM 42 checks the database 36, and attempts to determine the requested information. The database 36 includes subscriber information such as name and telephone numbers of subscribers, addresses, etc. If the ACHM 42 cannot totally handle the incoming call, the call is placed in the appropriate buffer 40. In one preferred embodiment, the switch 30 associates information in the database 36 with information provided by the caller. When the call is taken out of the buffer 40 and provided to an agent, the switch 30 then provides the associated information to the agent via the computer network 44. Typically, associated information facilitates the agent in handling the call efficiently. For example, in one embodiment, the associated information includes information collected from the customer by the ACHM 42, i.e. city and listing, and typically, the associated information is then played to the agent without some of the initial silence before, between and after the customer verbal input.

Each one of the buffers 40 is associated with one of the workforces 32, and typically, multiple buffers, sometimes referred to as queues, are associated with a single workforce. For example, the buffers 40(1)-40(3) are associated with the directory assistance workforce 32(1). Thus, when the switch 30 receives an incoming directory assistance call that the ACHM 32 cannot handle the switch 30 places the incoming call into one of the buffers 40(1)-40(3). Typically, the directory assistance agents handle "Directory Assistance Type" calls based upon geographic regions because the directory assistance agents can normally handle calls faster for regions with which they are familiar. So, in one embodiment, the buffers 40(1)-40(3) are associated with different geographical regions, so that all of the "Directory Assistance Type" calls from a particular region are sent into the same buffer, and directory assistance agents who are familiar with that region handle those calls.

In addition, the buffers for a workforce 32 can be prioritized. In one embodiment, high priority calls are put into one buffer and lower priority calls are placed in a different buffer. Typically, switch 30 handles the calls for a workforce 32 on a quasi first-in-first-out basis. For example, in one embodiment, the higher priority calls are prioritized by adding a "fictitious wait time" (FWT) to them, and then the switch 30 takes calls out of the buffer based upon a "pseudo-wait time" (PWT), which is the sum of the FWT and the real wait time (RWT), where RWT is the actual amount of time that the call has been in the buffer. For example, the FWT for buffer 40(1)

is zero seconds, and the FWT for buffer 40(2) is two seconds. Thus, the RWT and PWT for calls in buffer 40(1) are the same, whereas, the PWT is two seconds ahead of the AWT for calls in buffer 40(2). The PWT for call 1 in buffer 40(2) is 3.2 seconds while its AWT is only 1.2 seconds. Based upon the PWT for calls in buffers 40(1) and 40(2), the switch 30 will take calls "1" and "2" from buffer 40(2) before taking call "1" from buffer 40(1).

The switch 30 provides system data to the force management system 28 and database 36. Various switch configurations typically use either scans or time stamps to determine how long calls wait for service. For this discussion, switch 30 receives counts and directs calls to the buffers and scans the buffers 40 every 10 seconds or so the buffers 40 every 10 seconds or so and determines how long each call has been in one of the buffers, i.e., the RWT for each of the calls. The switch 30 may then determine an average RWT for the calls in each buffer and provide an instantaneous buffer count and average RWT for each buffer, or the switch 30 may average the results from several scans together. However, for a given time span, the system data includes, but is not limited to, the number of calls received by the switch over the given time-span, the number of calls handled by the ACHM 38 over the given time-span, the average number of calls in each buffer 40 over the given time-span, and the average RWT for calls in each buffer over the given time-span. Typically, the system data is reported from the switch to the FMS 28 and database 36 every 10 seconds or so. However, in alternative embodiments, the switch 30 may report system data more frequently or less frequently.

The switch also monitors agents in the workforces 32 and the super workforce 34. Before discussing the system data that is related to the agents in more detail, it is helpful to define some terms. For the purposes of this disclosure, a "tour" is defined as the time-spans that an agent is scheduled to work, and a "switch-tour" is defined as the time-spans that an agent is scheduled to be logged into the switch 30. On any given day, an agent's tour and switch-tour can differ due to scheduled training or other reasons. "Compliance" is defined as the percentage of an agent's switch-tour that the agent is logged into the switch. "Personal-occupancy" is defined as the percentage of an agent's switch-tour that the agent spends handling calls. The system data reported by the switch 30 includes personal-occupancy and compliance for each of the agents logged into the switch 30. The system data also includes personal average work time (AWT) for each of the agents, where average work time is the average amount of time that an agent spends handling a call. Because the switch 30 monitors, among other things, who is logged-in, when they logged-in and logged-out, how many calls the agents received, how long the calls lasted, etc., the system data reported by the switch 30 can include other quantities not described hereinabove. The average-work-time, occupancy, compliance, etc. can be calculated on a per-agent (personal) basis and/or calculated for the entire workforce.

Referring to FIG. 3, the FMS 28 includes a memory 46 having a statistical analysis/forecasting module 48, a call-statistics database 50, agent-profiles 52, and an efficiency report generator 118. The call statistics database 50 includes accumulated statistics 54 and daily logs 56. The accumulated statistics 54 and daily logs 56 are broken down into workforces 32. Among other things, the statistical analysis/forecasting module 48 processes data in the call-statistics database 50 to generate, among other things, the accumulated statistics.

FIG. 4 illustrates one exemplary daily log 56 for workforce 32(5), and FIG. 5 illustrates exemplary accumulated statistics 54 for workforce 32(5). The quantities calculated and tabulated in the daily log 56 and the accumulated statistics 54 are generated by the switch 30 and FMS 28.

Referring to FIG. 4, exemplary daily log 56 includes the date of the log and quantities such as, but not limited to, daily call volume, daily work volume, daily average work time (AWT), daily average time-to-answer (ATA) and daily occupancy (OCC). The daily call volume is simply the number of calls received by workforce 32(5) during the day associated with the daily log, which in this example is Aug. 21, 2003.

The daily AWT is the average amount of time that an agent in workforce 32(5) spends working a call on that day. The daily ATA is the average amount of time a call spends in a buffer on that day. The daily occupancy (OCC) is a measure of the amount of time that the agents in workforce 32(5) work incoming calls on that day. The daily OCC is the average of the personal-occupancy for the agents in the workforce on that day.

The daily work volume is the amount of time in CCS (Centum Call Seconds) or XCS, a measurement of time where 1XCS equals 10 seconds where the product of the daily call volume and AWT divided by 100. Generally, the different workforces handle calls of different complexity, and the time to handle a call is generally proportional to the complexity of the call. For example, calls to the billing workforce will require more time to handle than calls to the directory assistance workforce, and therefore, the AWT for the billing workforce is greater than the AWT for the directory assistance workforce. The work volume provides a way to compare the workforces 32 regardless of the type of calls that the different workforces handle.

Typically, the daily log 56 is kept in the statistical database 50 for a predetermined period of time such as six (6) months. The daily logs 56 are used for, among other things, spotting trends, scheduling agents, and refining workforce lines, as will be explained hereinbelow. In one embodiment, the daily log might be broken down into segments of time such as, but not limited to, morning, evening, and night, and the statistics for each segment of time are then calculated.

Referring to FIG. 5, the accumulated statistics 54 include, among other things, averages of daily statistics. Thus, in one embodiment, the accumulated statistics 54 are averages of statistics that are found in the daily log that have been accumulated over a period of years. Typically, the accumulated statistics are based upon what is known as an average business day (ABD). Thus, Saturdays and Sundays, and holidays, are not included in the accumulated ABD statistics 54. However, call statistics are also accumulated for non-ABD days such as Saturdays and Sundays, and those accumulated call statistics are used in projecting call volume. Typically, accumulated statistics 54 are used by the force management system 28 for, among other things, scheduling agents for a workforce 32 and/or super workforce.

The accumulated statistics can be averaged over a long period of time such as the entire time span over which the telephone system 10 has records of daily logs or shorter time-spans such as the last six years, or last six months, etc. One advantage of averaging over a long period is that the daily fluctuations are "washed" out of the average, but a disadvantage is that trends may also be lost. For example, assume that the ABD work volume for eight of the last ten years had remained at an approximate constant (X), in year nine the ABD work volume was 1.125X and in year ten it was 1.5X. In that case, the average ABD work volume of the last ten years is then 1.0625X, which obscures the rate of growth over the last two years.

In one preferred embodiment, the statistical analysis/forecasting module 48 fits the work volume data to a predetermined parameterized function, and then uses the parameterized function to extrapolate work volumes for a subsequent week. Those skilled in the art are familiar with algorithms, such as, but not limited to, least-square-fit for fitting data and all such algorithms are intended to be within the scope of the disclosure. Furthermore, as those skilled in the art will recognize, by fitting the data to a parametric function, derivatives including first order and higher order derivatives of the function can be taken to help extrapolate the data. In one embodiment, the statistical analysis/forecasting module 48 also includes logic to apply probabilistic algorithms such as, but not limited to, Erlang C to, among other things, forecast work volume and operator lines, which will be explained in detail hereinbelow.

An exemplary agent profile 52 is illustrated in FIG. 6 and the agent profile includes, an agent identifier 58, a workforce identifier 60, an office identifier 62, language skills identifiers 64, and work skills identifier 66. The agent associated with the exemplary agent profile 52 currently works in remote office 5 in workforce 32(16). The agent associated with the exemplary agent profile 52(A) is bilingual (English and Spanish) and has been trained in both directory assistance and billing. The agent profile 52 includes skill ratings for each area that the agent has been trained, such as a directory assistance rating 68 and a billing rating 70. Each rating includes, among other things, statistics related to the agent's efficiency. The agent has an average work time (AWT) of 2.5 seconds for directory assistance and 5.5 seconds for billing. The skill ratings 68 and 70 also include the agent's error rate, tour compliance, switch-tour compliance, and years of experience. Switch-tour compliance is defined as the percentage of time that the agent is "logged into" the switch 30 per the workable amount of time per tour. Tour compliance is the probability that the agent will actually report to work for a tour that they are scheduled to work. Other quantities can also be included in the agent profile 52. In an alternative embodiment, quantities can be broken down into time segments. For example, AWT can be broken down into the first half of a tour, and a second half of a tour, or for every fifteen minutes, or other time intervals. In one embodiment, the agent profile for a new agent, or an agent who is new to a workforce, is given an agent profile that has default values, among other things, for the skill ratings. After the agent has been trained and in the position for a set period of time, the default values are replaced by calculated values related to the agent's record.

Referring to FIG. 7, among other things, the FMS 28 generates an agent line 72 for a workforce 32. The agent line 72 shows the number of agents in a workforce that are projected to be needed for every fifteen minutes of an upcoming day. For the purposes of this disclosure, each fifteen-minute time span of the agent line 72 is a agent line segment 74. For a directory assistance workforce, the agent line 72 covers a 24-hour day, whereas the agent line for a billing assistance workforce may only cover ten hours of a day such as from 8:00 a.m. through 6:00 p.m. The agent line 72 is established by the FMS 28 using, among other things, historical information stored in the database 36.

Figure 8:
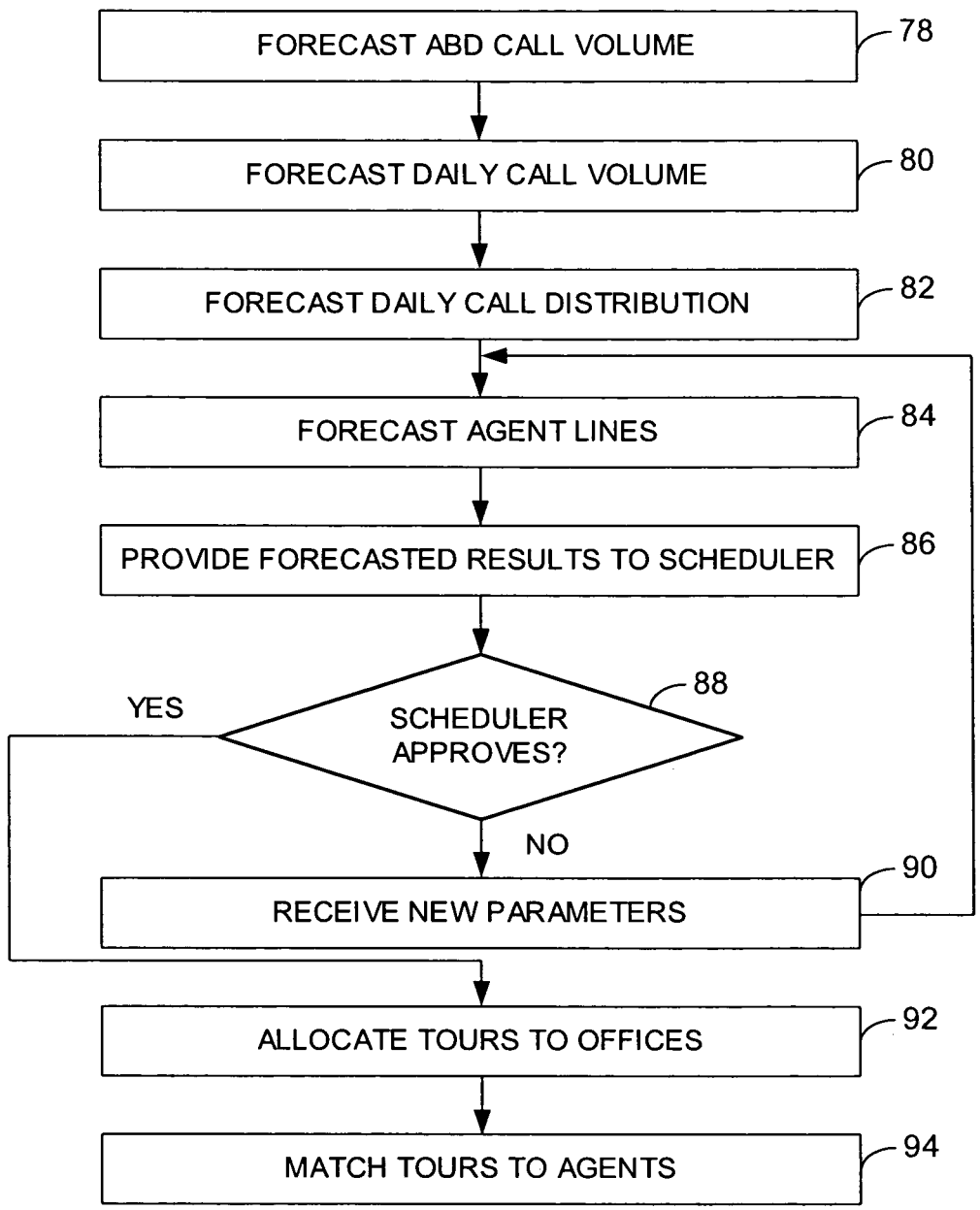
FIG. 8 is a flow chart illustrating steps for creating a projected agent line.

Referring to FIG. 8, the steps 76 shown in FIG. 8 include exemplary steps taken by the FMS 28 to generate the agent line 72 for a day in an upcoming week. Typically, the upcoming week is approximately two weeks in the future. The projected agent line 72 is forecasted approximately two weeks in advance so that the agents in the workforce having the projected agent line can be properly scheduled.

In step 78 the FMS 28 forecasts the ABD work volume for the upcoming week. The forecasted ABD work volume is based upon historical information and the database 36 such as the historical ABD work volume. Other factors may include, but are not limited to, historical trends in the ABD work volume. For example the statistical analysis/forecasting module can fit the work volume data to a parameterized function and then uses the parameterized function to forecast the work volume for the upcoming week. In one embodiment, a predetermined number of terms from a Taylor series expansion of the parameterized function is used to extrapolate the ABD work volume for the upcoming week.

In step 80, the daily work volume for each day of the week for the upcoming week is forecasted. Generally, the daily work volume follows historical trends. For example, the daily work volume on a Sunday is 75% of the work volume for an ABD. Table 1 shows a historical daily work volume per ABD work volume for an exemplary call center

TABLE 1

| | Day | | | | | | |
|---|---|---|---|---|---|---|---|
| | Sun. | Mon. | Tues. | Wed. | Thurs. | Fri. | Sat. |
| Work Volume/ ABD | 0.75 | 1.01 | 1.02 | 0.99 | 0.97 | 1.01 | 0.90 |

In step 82, the FMS 28 generates a forecasted daily call distribution for every fifteen minutes for each day of the upcoming week. Each forecasted daily call distribution is based at least in part upon historical information and database 36. Specifically, the database includes historical call distributions for each day of the week.

In step 84, the FMS 28 uses adjustable parameters such as desired agent occupancy and desired AWT to generate forecasted agent lines for each day of the upcoming week based upon the forecasted call statistic. In one embodiment, the FMS 28 employs the statistical analysis/forecasting module 48 to apply algorithms such as Erlang C to calculate probabilities to determine agent requirements to meet a desired standard such as, but not limited to, average-time-to-answer to forecast the operator line. In step 86, the FMS 28 provides the forecasted results to a scheduler.

In step 88, the scheduler approves or disapproves the forecasted agent lines. If the scheduler disapproves, then in step 90, the scheduler provides new adjustable parameters to the FMS 28, and then the FMS 28 returns to step 84. On the other hand, if the scheduler approves, then in step 92, the FMS 28 allocates tours to the offices. For example, based upon an agent line, the FMS 28 determines that five agents need to start their tours at 6:00 a.m., nine agents need to start their tours at 7:00 a.m., and three agents need to start at 7:30 a.m. The FMS 28 then determines the number of tours at each starting time that should be allocated to the offices based at least in part upon the following criteria: the physical capabilities of each office and the number of agents available in each office. Offices having larger physical capabilities (more terminals/consoles) and a large number of agents will receive more tours than smaller offices.

In step 94, the FMS 28 matches the allocated tours to individual agents. Generally the matching of tours to agents is done at least upon seniority or other work place rules and agent preference.

In one preferred embodiment, among other things, the efficiency report generator 118 of the FMS 28 provides the control center 16 with workforce reports that call center supervisors use to manage the agents of the workforces 32. Typically, a call center supervisor is responsible for managing one or more of the workforces 32. A call center supervisor will use the workforce reports in conjunction with other information such as the projected agent line to manage his or her workforces. The workforce reports generally include call statistics such as work volume, call volume and AWT. Table 2 shows an exemplary workforce report.

TABLE 2

| Time | Work Volume | | Call Volume | | ATA | | Number of Agents | |
|---|---|---|---|---|---|---|---|---|
| | Proj. | Act. | Proj. | Act. | Proj. | Act. | Proj. | Act. |
| 09:00-09:15 | 15 | 15 | 60 | 60 | 2.3 | 2.1 | 9 | 9 |
| 09:15-09:30 | 14 | 15 | 58 | 60 | 2.2 | 2.1 | 9 | 9 |
| 09:30-09:45 | 15 | 16 | 60 | 62 | 2.3 | 2.2 | 9 | 9 |
| . | . | . | . | . | . | . | . | . |
| . | . | . | . | . | . | . | . | . |
| . | . | . | . | . | . | . | . | . |

The workforce report is broken down into fifteen minute intervals and it includes work volume (forecasted and actual), call volume (forecasted and actual), average time to answer (forecasted and actual), and number of agents (forecasted and actual). In one embodiment, the call center supervisor uses the workforce report along with the projected agent line and with past call statistics to determine whether to adjust the projected agent line. A call center supervisor looking at Table 2 and the agent line 72 will decide whether the number of agents scheduled for the next agent line segment 74 is sufficient. In addition to Table 2, the call center supervisor can review daily logs to discern trends. For example, if the current day is a Friday, the call center supervisor will compare the workforce reports for a given workforce with yesterday's daily log for the given workforce. The call controller will then determine how yesterday's projected agent line corresponded to the actual agent line of yesterday; how the projected work volume corresponded to the actual work volume; and similarly, compare other projected and actual call statistics such as, but not limited to, call volume, AWT, and occupancy. The call center supervisor can also compare call statistics for Thursday's and Friday's of past weeks to discern, among other things, trends and how well projected agent lines had corresponded to actual agent lines.

In addition to receiving reports from the efficiency report generator 118, call center supervisors also receive graphical information from the efficiency report generator 118. The call center supervisors are responsible for managing the agent lines of their assigned workforces such that the workforces meet or exceed predetermined benchmarks. Typically for a workforce that receives incoming calls the predetermined benchmarks are for call statistics such as AWT, number of calls in buffer, or other statistics. Among other things, the FMS 28 receives system data from the switch 30, and the efficiency report generator 118 uses the system data to generate the workforce reports and other reports such as efficiency reports, which are typically provided to call center supervisors in graphical format.

Figure 9C:
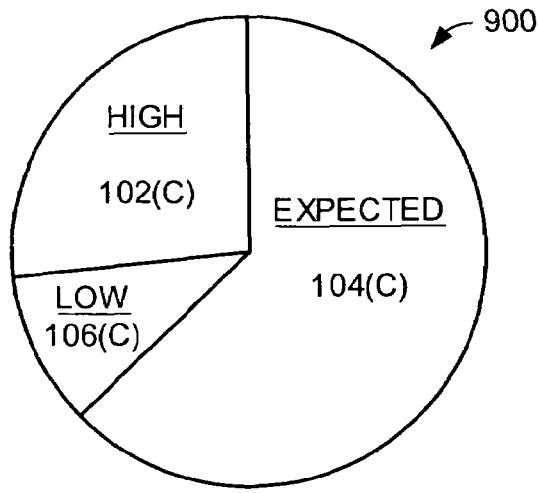

Referring to FIGS. 9A-9C, FIG. 9A illustrates a year-to-date efficiency report 96; FIG. 9B illustrates a month-to-date efficiency report 98; and FIG. 9C illustrates a daily efficiency report 100 for the current day. In one embodiment, the efficiency reports 96 through 100 are presented in a pie chart format having three categories, high 102, expected 104 and low 106. In other embodiments, the efficiency reports are presented in other graphical formats such as column graphs, or bar graphs, among others.

The high category 102 represents the percentage of time that the workforce exceeds a first predetermined benchmark, and the low category represents the percentage of time that the workforce fails to meet a second predetermined benchmark. The expected category 104 represents the percentage of time that the workforce operates within the first and second predetermined benchmarks.

In one preferred embodiment, the efficiency reports are generated, among other ways, on a call center supervisor basis. Thus, the report reflects not only how well the workforce is performing, but also how well the call center supervisor is managing his or her workforce.

Year-to-date, month-to-date and today's efficiency reports 102, 104 and 106, respectively, and other efficiency reports, can be generated to show the efficiency of one or more workforces managed by a single call center supervisor. Aggregate efficiency reports, i.e., efficiency reports reflecting the efficiency of more than one workforce, enable a call center supervisor to check their own efficiency/managing skills. Generally, bonuses, raises, promotions, etc. for call center supervisors are related to their efficiency/managing skills. Thus, the aggregate efficiency reports provide a simple way for the call center supervisor (and their managers) to monitor their own efficiency and progress towards goals such as bonuses, raises, etc.

In one embodiment, each agent line segment 74 is considered a management-opportunity, and the call center supervisor is graded upon the results of their management-opportunities. For example, if a call center supervisor manages a call center for 9 hours on a given day, the call center supervisor has 36 management-opportunities for that day. For each management-opportunity that the work force fails to meet, or meets, or exceeds, its target goals, the call center supervisor is credited with failing to meet (low), meeting (on target), or exceeding (high) his/her target. Then by adding the management-opportunities, the number of lows, highs and on target a percent is determined based on the workforce monitored. If the call center supervisor is managing more than one work force, then he/she is graded on the performance of all of the work forces that he/she is managing, and the management-opportunities of the different work forces are added together and divided by the total number of management-opportunities. The management-opportunities for different work forces can be weighted the same or different.

Figure 10:
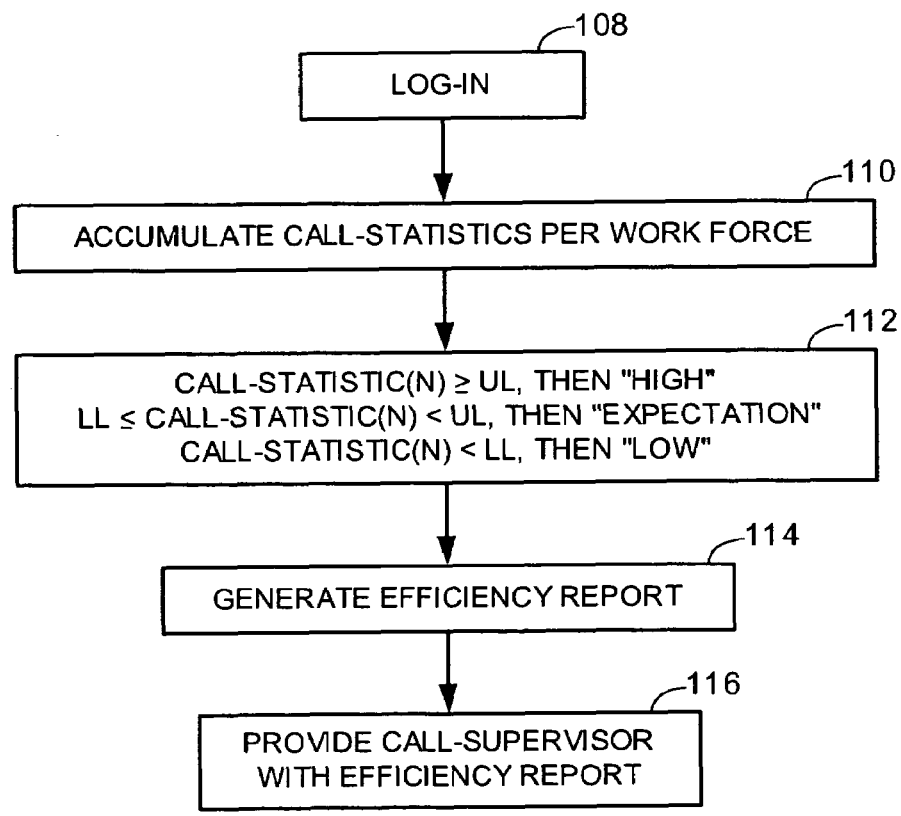
FIG. 10 is a flow chart illustrating steps for creating a graphical efficiency report.

FIG. 10 illustrates steps performed for generating efficiency reports. In step 108, the call center supervisor logs into the FMS 28. When the call center supervisor logs into the FMS 28, the FMS 28 associates the call center supervisor with the workforces that the call center supervisor manages.

In step 110, the FMS 28 receives from the switch 30 call statistics for each of the workforces that the call center supervisor manages. In step 112, the efficiency report generator 118 applies the benchmarks to the call statistics to determine whether each call statistic is in the high category 102, the expected category 104, or the low category 106. The efficiency report generator 118 can generate efficiency reports for any number of call statistics, and generally, each of the call statistics for which the efficiency report generator 118 generates a report will have predetermined upper limit and lower limit benchmarks.

In step 114, the efficiency report generator 118 generates efficiency reports for the call center supervisor. The efficiency report generator 118 can generate efficiency reports on a predetermined basis, such as every fifteen minutes, or other intervals such as on a daily basis, or can generate efficiency reports upon demand. In one embodiment, the user can input a time span such as the last half hour, the last day, week, etc. over which the efficiency report is generated. In yet another embodiment, the user can select to generate efficiency reports on a per call center basis, on a network statistic basis, for selected call centers, or any combination thereof. Typically, the overall efficiency of the call centers and the call-center supervisors are determined from looking at multiple criteria such as, but not limited to, average work time, average occupancy, average time to answer, etc., and an overall efficiency report in which the various criteria weighted and combined is generated.

In step 116, the FMS 28 provides the efficiency reports to the call center supervisor.

The efficiency report generator 118, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A method of providing efficiency reports, the method comprising:
   associating a call-center supervisor with a call center;
   obtaining a network statistic for the call center, wherein the network statistic is related to usage of a network by the call center;
   categorizing the network statistic into one of a group of multiple categories,
   wherein the categorizing further includes:
   determining whether the numerical value of the network statistic is within one of a set of ranges comprising a first range of values, a second range of values, and a third range of values;
   associating a first category of the group of multiple categories with network statistic responsive to the numerical value of the network statistic being with in the first range of values; and
   providing a pictorial representation of efficiency for the call-center supervisor using the group of multiple categories.

2. The method of claim 1, further including:
   associating the call-center supervisor with a second call center;
   obtaining a second network statistic for the second call center, wherein the second network statistic is related to usage of the network by the second call center; and
   categorizing the second network statistic into one of the group of multiple categories.

3. The method of claim 1, further including:
   obtaining a second network statistic for the call center, wherein the second network statistic is related to usage of the network by the call center; and
   categorizing the second network statistic into one of a second group of multiple categories;
   combining the first group and second group of multiple categories into a third group of multiple categories, wherein the third group of multiple categories is provided in pictorial representation.

4. The method of claim 1, further including:
   associating the call-center supervisor with a second call center;
   obtaining a second network statistic for the first call center and network statistics for the second call center; and
   categorizing the second network statistic into one of a second group of multiple categories;
   categorizing a third network statistic for the second call center into one of a third group of multiple categories;
   combining the first group, second group, and third group of multiple categories into a fourth group of multiple categories, wherein the fourth group of multiple categories is provided in pictorial representation.

5. The method of claim 1, wherein the pictorial representation is a pie-chart.

6. The method of claim 1, wherein the pictorial representation is a bar graph.

7. The method of claim 1, wherein the pictorial representation is a column graph.

8. An efficiency report generator, the efficiency report generator comprising:
   logic configured to associate a call-center supervisor with a call center;
   logic configured to obtain a network statistic for the call center, wherein the network statistic is related to usage of a network by the call center;
   logic configured to categorize the network statistic into one of a group of multiple categories, wherein the logic configured to categorize further includes:
   logic configured to determine whether the numerical value of the network statistic is within one of a set of ranges comprising a first range of values, a second range of values, and a third range of values;
   logic configured to associate a first category of the group of multiple categories with network statistic responsive to the numerical value of the network statistic being within the first range of values; and logic configured to provide a pictorial representation of efficiency for the call-center supervisor using the group of multiple categories.

9. The efficiency report generator of claim 8, further including:

logic configured to associate a second category of the group of multiple categories with network statistic responsive to the numerical value of the network statistic being within the second range of values; and logic configured to associate a third category of the group of multiple categories with network statistic responsive to the numerical value of the network statistic being within the third range of values.

10. The efficiency report generator of claim 8, further including:

logic configured to associate the call-center supervisor with a second call center;

logic configured to obtain a second network statistic for the second call center, wherein the second network statistic is related to usage of the network by the second call center; and logic configured to categorize the second network statistic into one of the group of multiple categories.

11. The efficiency report generator of claim 8, further including:

logic configured to obtain a second network statistic for the call center, wherein the second network statistic is related to usage of the network by the call center; and logic configured to categorize the second network statistic into one of a second group of multiple categories;

logic configured to combine the first group and second group of multiple categories into a third group of multiple categories, wherein the third group of multiple categories is provided in pictorial representation.

12. The efficiency report generator of claim 8, further including:

logic configured to associate the call-center supervisor with a second call center;

logic configured to obtain a second network statistic for the first call center and network statistics for the second call center; and logic configured to categorize the second network statistic into one of a second group of multiple categories;

logic configured to categorize a third network statistic for the second call center into one of a third group of multiple categories;

logic configured to combine the first group, second group, and third group of multiple categories into a fourth group of multiple categories, wherein the fourth group of multiple categories is provided in pictorial representation.

13. The efficiency report generator of claim 8, wherein the pictorial representation is a pie-chart.

14. The efficiency report generator of claim 8, wherein the pictorial representation is a bar graph.

15. The efficiency report generator of claim 8, wherein the pictorial representation is a column graph.

* * * * *